US005606444A

United States Patent [19]
Johnson et al.

[11] Patent Number: 5,606,444
[45] Date of Patent: *Feb. 25, 1997

[54] WIDE-ANGLE, HIGH-SPEED, FREE-SPACE OPTICAL COMMUNICATIONS SYSTEM

[75] Inventors: Bruce E. Johnson, Seattle; Thomas A. Lindsay, Brier; David L. Brodeur, Seattle; Randall E. Morton, deceased, late of Redmond, by Lori Morton, legal representative; Mark A. Regnier, Bothell, all of Wash.

[73] Assignee: Eldec Corporation, Lynnwood, Wash.

[*] Notice: The term of this patent shall not extend beyond the expiration date of Pat. No. 5,359,446.

[21] Appl. No.: 325,965

[22] Filed: Oct. 20, 1994

Related U.S. Application Data

[63] Continuation of Ser. No. 943,328, Sep. 10, 1992, Pat. No. 5,359,446.

[51] Int. Cl.⁶ .................................................. H04B 10/00
[52] U.S. Cl. ........................ 359/152; 359/154; 359/161; 359/172
[58] Field of Search ...................... 359/113, 129, 359/143, 152–154, 159, 161, 164, 167, 172, 194

[56] References Cited

U.S. PATENT DOCUMENTS

| | | | |
|---|---|---|---|
| 4,422,180 | 12/1983 | Wendt | 455/144 |
| 4,691,385 | 9/1987 | Tupman | 455/607 |
| 4,882,770 | 11/1989 | Miyahira et al. | 455/603 |
| 4,921,468 | 5/1990 | Miwa | 455/144 |
| 5,359,446 | 10/1994 | Johnson et al. | 359/152 |

FOREIGN PATENT DOCUMENTS

| | | |
|---|---|---|
| 338789 | 10/1989 | European Pat. Off. . |
| 3008700A1 | 3/1980 | Germany . |
| 4034154 | 5/1991 | Germany . |
| 37742 | 4/1981 | Japan . |
| 78233 | 4/1986 | Japan . |
| 2228385 | 8/1990 | United Kingdom . |
| WO90/03072 | 3/1990 | WIPO . |

OTHER PUBLICATIONS

I. Catling et al., "Road Transport Informatics in Europe—Major Programs and Demonstrations," *IEEE Transactions on Vehicular Technology*, vol. 40, No. 1, Feb. 1991, pp. 132–140.

"Colloquium on Short Range Communications Systems and Techniques," IEEE, 1983.

(List continued on next page.)

*Primary Examiner*—Wellington Chin
*Assistant Examiner*—Kinfe-Michael Negash
*Attorney, Agent, or Firm*—Christensen, O'Connor, Johnson and Kindness PLLC

[57] ABSTRACT

A free-space optical communications system for transmitting data between an aircraft computer system (14) and a ground-based computer system (12). The system includes a pair of corresponding optical transmitters (36) and optical receivers (38) that transmit and receive optical signals transmitted between the two computer systems. Included within each optical transmitter is one or more light-emitting diodes (42) that produce optical signals corresponding to the data to be transmitted. A beam-forming horn (44) is bonded directly to the light-emitting diodes to direct the optical signal uniformly over a target area. The optical receiver includes one or more infrared windows (50) to reduce the mount of ambient light received by the optical receiver. A compound parabolic concentrator (64) collects light transmitted from the optical transmitter and directs the light onto an avalanche photodiode (66), which includes thermal bias compensation. An AC network couples the output signal of the photodiode to a transimpedance amplifier (70). An optional optical shroud (34) surrounds the optical transmitters and receivers to further reduce the amount of ambient light that is received by the optical receivers.

21 Claims, 6 Drawing Sheets

OTHER PUBLICATIONS

F. R. Gfeller et al., "Infrared Communication for In-house Applications," *Digest Papers, IEEE Computer Society International Conference 17th Proceeding, Fall COMPCON'78* (IEEE Cat. No. 78CH1388-8C), pp. 132-138.

W. L. Hayden et al., "NASA's Flight-Technology Development Program: A 650 Mbps Laser Communications Testbed," *Proceedings of the SPIE*, vol. 1417, 1991, pp. 182-199.

K. A. Joyce, "Low-Cost Pointing-and-Tracking System for Optical Communications," Applied Technology Associates, Inc., Final Report, Oct. 1987-May 1988.

H. Kamimura et al., "Radiated Optical Communication System for Mobile Robots," *Proceedings of the 4th International Conference on Automated Guided Vehicle Systems: AGVS-4*, Jun. 1986, pp. 1372-1381.

E. L. Kerr, "Integral Sunshade for an Optical Reception Antenna," *Optical Engineering*, vol. 30, No. 9, Sep. 1991, pp. 1372-1381.

M. King, "Security with Free Space Optical Link," *New Electronics*, vol. 22, No. 5, Jun. 1989, pp. 58-59.

M. D. Kotzin et al., "A Duplex Infrared System for In-Building Communications," 36th IEEE Vehicular Technology Conference, May 1986, pp. 179-185.

H. Levenstein, "Wide Field of View Optics Applied to Multi-User Optical Communication," *Proceedings of the SPIE—The International Society for Optical Engineering*, vol. 1044, Jan. 1989, pp. 173-178.

A. K. Majumdar et al., "Wide-beam Atmospheric Optical Communication for Aircraft Application Using Semicoductor Diodes," *Applied Optics*, vol. 22, No. 16, pp. 2495-2504.

R. G. Marshalck, "An Optical Approach to Proximity-Operations Communications for Space Station Freedom," *Proceedings of the SPIE—The International Society for Optical Engineering*, vol. 1417, Jan. 1991, pp. 53-62.

J. J. O'Reilly et al., "New APD-Based Receivers Providing Tolerance to Alignment Jitter for Binary Optical Communications," *IEEE Proceedings J (Optoelectronics)*, vol. 135, No. 2, Apr. 1988, pp. 119-125.

T. N. Rodgers, "An Optical Communication System for Aircraft," *SPIE*, 1978, pp. 108-113.

S. E. Shladover, "Automatic Vehicle Control Developments in the PATH Program," *IEEE Transactions on Vehicular Technology*, vol. 40, No. 1, Feb. 1991, pp. 114-130.

R. von Tomkewitsch, "Dynamic Route Guidance and Interactive Transport Management with ALI-SCOUT," *IEEE Transactions on Vehicular Technology*, vol. 40, No. 1, Feb. 1991, pp. 45-50.

L. E. Wood et al., "Optical Communication Systems for Short-Haul Applications," Mar. 1973.

Yen et al., "The Use of Directed Optical Beams in Wireless Computer Communications," *IEEE Globe Comm.*, 85, New Orleans, Dec. 2-5, 1985, pp. 1181-1184.

WIDE-ANGLE, HIGH-SPEED, FREE-SPACE OPTICAL COMMUNICATIONS SYSTEM

RELATED APPLICATION

The present application is a continuing application of our prior U.S. patent application Ser. No. 07/943,328 filed Sep. 10, 1992, now U.S. Pat. No. 5,319,446, titled "Wide-Angle, High-Speed, Free-Space Optical Communication System" which is expressly incorporated by reference herein.

FIELD OF THE INVENTION

The present invention relates to communications systems in general and, in particular, to infrared, free-space optical communications systems.

BACKGROUND OF THE INVENTION

In the last 20 years, computers have played an ever increasing role in the airline industry. For example, computers are used onboard an aircraft for such tasks as aiding navigation, scheduling maintenance, monitoring the operation of equipment as well as for controlling the position of the flight control surfaces to fly the aircraft. On the ground, computers are used to ticket passengers, keep track of luggage, maintain records of seat availability, schedule departure changes, etc. In the past, there has only been a limited exchange of data between the aircraft computer system and the ground-based computer system used by an airline. Such exchange usually took place by hand carrying a floppy disk between the two computer systems.

Since the invention of computer networks, there has been considerable effort within the airline industry devoted to developing a communication system that connects the aircraft computer system to the ground-based computer system. Early efforts used digital radio but were unsuccessful because of the limited bandwidth available due to radio frequency spectrum allocation and contention/interference. One suggested method of establishing a higher bandwidth communication system was to connect the two computer systems together using a fiber optic communications link. In such a system, a fiber optic cable would extend from the ground-based computer system to a fiber optic cable connector disposed on the side of the aircraft. As the aircraft taxied into a dock, a member of the maintenance crew could plug the fiber optic cable into the side of the aircraft, thereby allowing the data communication to take place. However, such a solution was deemed undesirable due to the fragile nature of fiber optic cable connectors and the need for ground crew action. Additionally, it is possible that the aircraft could pull away from the dock without disconnecting the cable, causing subsequent delays and extensive damage to the fiber optic cable and aircraft.

To overcome the problems associated with a fiber optic cable-based communication system, an alternate communications scheme was suggested by the airlines industry. The alternate scheme involved the use of a free-space optical communications system that could transmit information between the aircraft computer system and the ground-based computer system using a modulated infrared light beam. The free-space optical communications system would eliminate the need for the fiber optic cable possible damage from the aircraft pulling away and disconnecting the cable. However, current free-space optical communications systems suffer from at least three problems that, in combination, prevent such communications systems from being readily usable in an aircraft to ground-based computer communication link.

First, current free-space optical communications systems do not operate at the high data rate that the airlines are requiring for a commercially viable communication system. For example, the Aeronautical Radio Incorporated (ARINC) standards group is currently developing a communications protocol that requires data communication between an aircraft and a ground-based computer system be accomplished at speeds of 100 Mbits/sec. Second, current state of the art high-speed, free-space optical communications systems often have a narrow field of view and, as such, require additional control systems to align the optical transceivers to ensure proper data transmission. Including such control systems into a free-space optical communications system adds significantly to the cost of the system, as well as introduces a likely source of system failure. Finally, current free-space optical communications systems will not operate in all types of weather conditions experienced at an airport.

Therefore, a need exists for a free-space optical communications system that can transmit data between an aircraft and a ground-based system at high speeds over all weather conditions. Additionally, the communication system should have a wide field of view to eliminate the need for any control systems to align the optical components of the system.

SUMMARY OF THE INVENTION

The present invention comprises a free-space optical communications system that transmits data between two computer systems at high speed, in all weather conditions, and without the need for precise alignment mechanisms. In the preferred embodiment of the present invention, the communication system is used to transmit information between an aircraft computer system and a ground-based computer system. The system includes a pair of optical transceivers, one of which is located on the aircraft and the other preferably located on an adjacent passenger loading bridge. Each transceiver includes an optical transmitter having one or more light-emitting diodes (LEDs) that produce optical signals corresponding to the data to be transmitted. Optically coupled to the LEDs is a nonimaging optical device such as a beam-forming horn to focus and uniformly distribute the optical signals over a target area in which the optical signals are to be received. Each transceiver also includes an optical receiver having one or more optical filters to reduce the mount of ambient light entering the receiver. A nonimaging optical collector such as a compound parabolic concentrator (CPC) is coupled with the optical filters and collects a portion of the optical signals produced by the optical transmitter. The CPC is optically coupled to a photodiode, such as an avalanche photodiode (APD), which produces an electrical output signal that corresponds to the optical signals received. The APD diode includes a biasing voltage supply having temperature compensation and automatic gain control (AGC) to allow operation over a wide temperature and signal level range. A current shunt is connected to the output of the APD diode to shunt away a portion of the output signal that is produced due to any ambient light collected by the CPC. An AC coupling means extracts a time varying portion of the output signal and feeds the time varying portion to an amplifier. The output of the amplifier is coupled to the receiving computer system. An optional optical shroud extends between the adjacent passenger loading bridge and the aircraft to surround the pair of optical transceivers and reduce the amount of ambient light that is collected by the optical receivers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a duplex, free-space optical communications system for transmitting information between two computer systems. As discussed above, the preferred embodiment of the present invention is used to transmit information between an aircraft computer system and a ground-based computer system. However, the present system could also be used to transmit information between any two computer systems, stationary or mobile, such as an automobile computer and a toll booth computer system, or from a computer system on a train to a ground-based computer system, etc.

Figure 1:
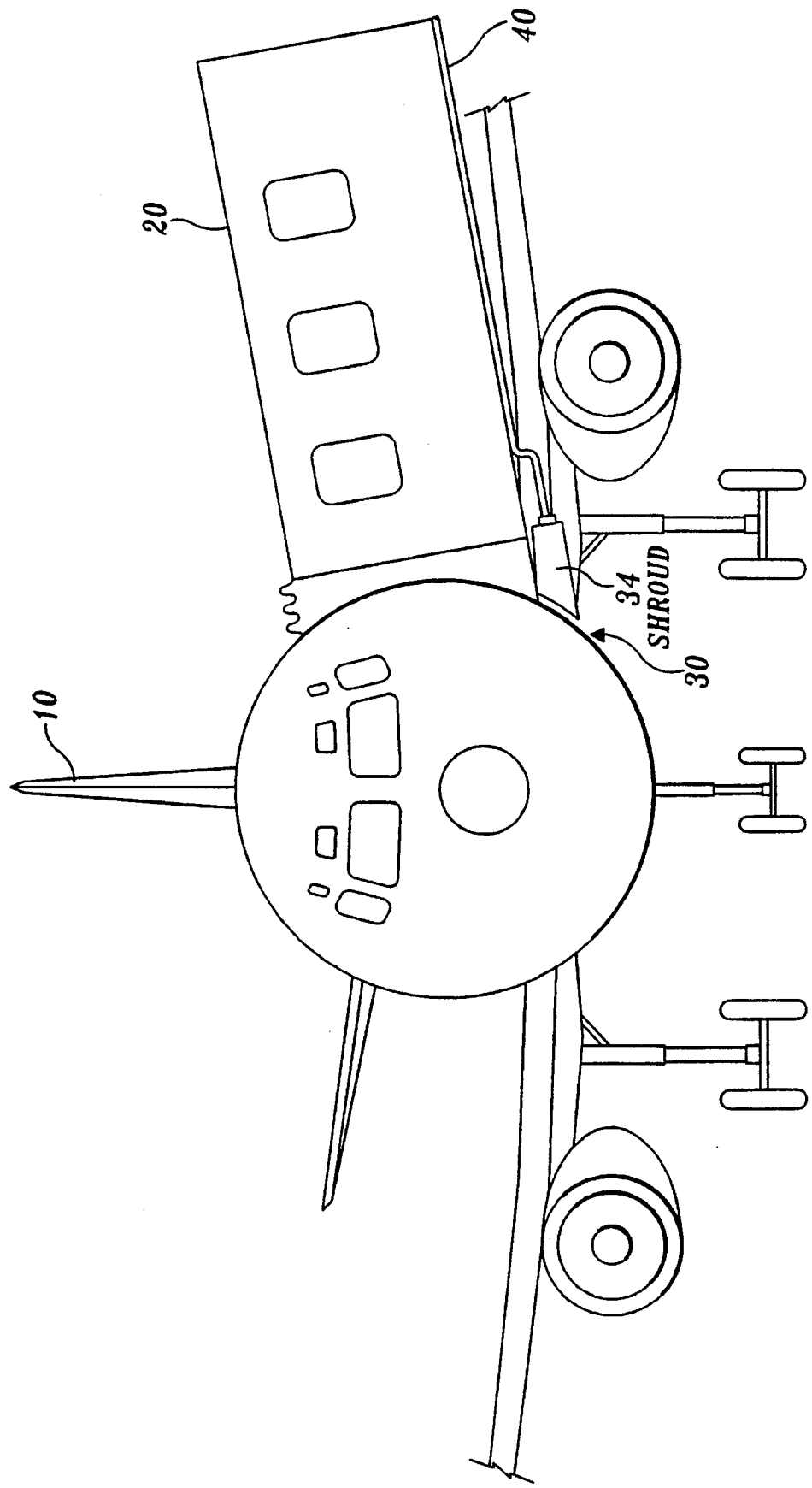
FIG. 1 shows a free-space optical communications system according to the present invention that transmits data between an aircraft computer system and a ground-based computer system.

FIG. 1 shows an aircraft 10 parked near a passenger loading bridge 20. As will be further described below, the free-space optical communications system 30 according to the present invention allows data to be transmitted using infrared light beams that are transmitted between an optical transceiver located behind an infrared window disposed in the side of the aircraft and a corresponding optical transceiver located underneath a passenger loading bridge 20. The transceiver disposed on the underside of the passenger loading bridge 20 is coupled to the ground-based computer system via a communications cable 40 such as a fiber optic cable. An optional optical shroud 34 may be mounted on the underside of the passenger loading bridge 20. The free-space optical communications system can transmit data between the aircraft computer system (not shown) and the ground-based computer system (also not shown) at a rate of 100 Mbits/sec. Additionally, as will be further described below, the free-space optical communications system according to the present invention has wide transmission beams and corresponding wide fields of view to compensate for misalignments between the aircraft 10 and the passenger loading bridge 20, and needs no active control mechanisms to align the optical transceivers.

Figure 2:
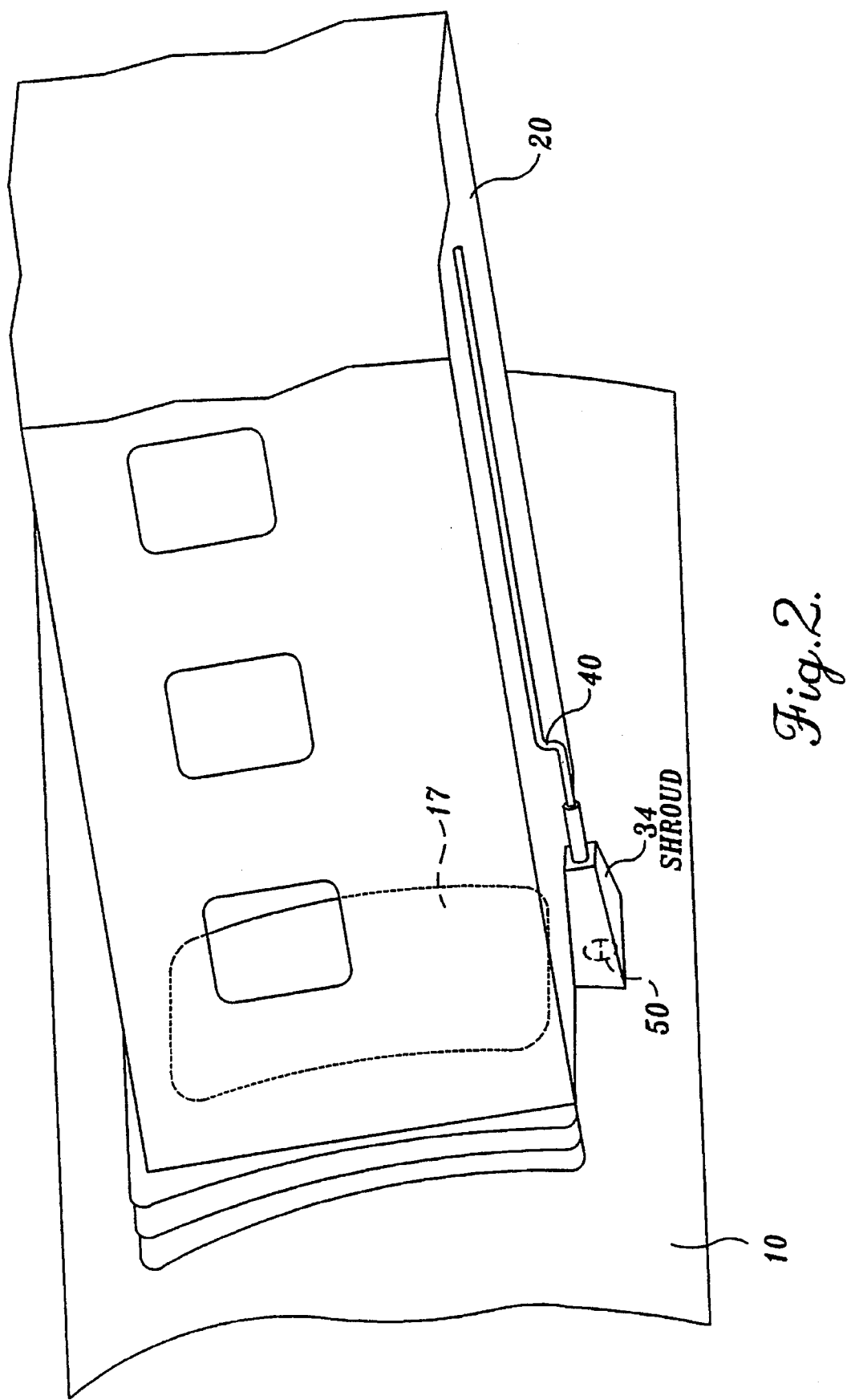
FIG. 2 shows an optional optical shroud that extends from a passenger loading bridge to the aircraft.

FIG. 2 shows how the free-space optical communications system according to the present invention is disposed underneath the passenger loading bridge 20 to transmit information between the aircraft computer system and the ground-based computer system. If the optical communications system is to be used in conditions of bright sunlight, the optical shroud can be used to reduce the amount of ambient light that enters the transceivers. The optional optical shroud 34 extends between the passenger loading bridge 20 and the aircraft 10 to reduce the amount of ambient light that reaches the optical transceivers when the aircraft is parked at the passenger loading bridge. The optical shroud 34 has a horn-shaped construction with a cross-sectional area slightly larger than the transmitted beam from the transceiver disposed on the passenger loading bridge 20.

The communications cable 40 extends between the optical transceiver located under the passenger bridge 20 and the ground-based computer system (not shown) to carry the data to be transmitted by and received from the ground-based computer system.

As will be further discussed below, the optical transmitters transmit infrared optical signals uniformly over large target areas. Correspondingly, the optical receivers have large fields of view. This ensures that data communication can take place regardless of where in the target area a corresponding transceiver is located. In the preferred embodiment, the aircraft transceiver includes an infrared window 50 that covers the transceiver and is located flush with the surface of the aircraft 10 in a position that is generally below a door 17. When the aircraft is properly docked next to the passenger loading bridge 20, the infrared window 50 will be located within the respective target area.

Figure 3:
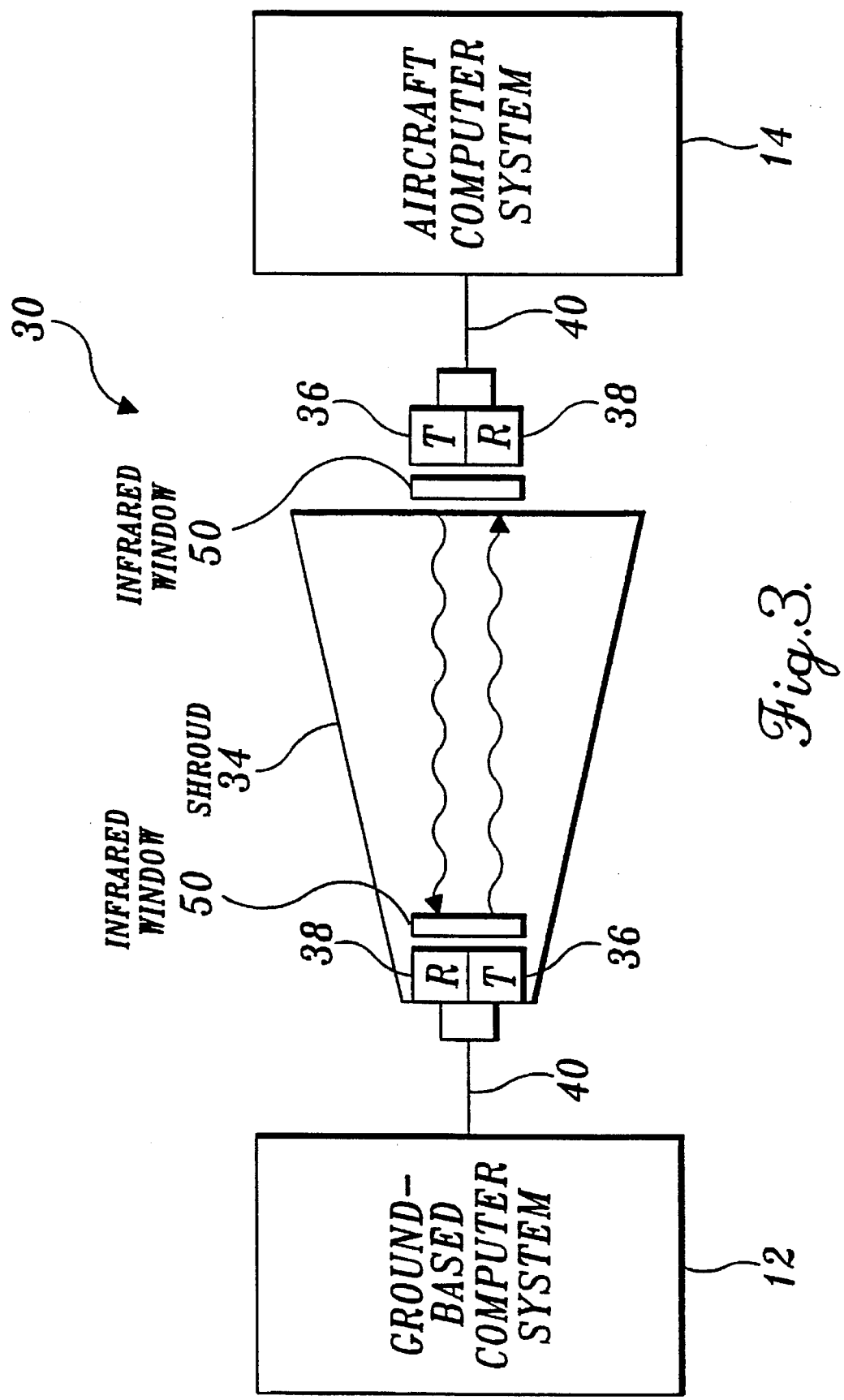
FIG. 3 shows a block diagram of the free-space optical communications system according to the present invention.

A block diagram of the free-space optical communications system according to the present invention is shown in FIG. 3. The free-space optical communications system 30 transmits data bidirectionally between a ground-based computer system 12 and an aircraft computer system 14. The system includes a pair of optical transceivers each of which includes a separate optical transmitter 36 and an optical receiver 38. To reduce the amount of ambient light that enters the optical receivers 38, the transceivers include a pair of infrared windows 50. Data is transmitted between the two computer systems 12 and 14 via a modulated infrared light beam produced by the optical transmitters 36. Each optical transceiver is coupled to its respective computer system via a communications cable 40. In the preferred embodiment of the present invention, data is transmitted in full duplex between the ground-based computer system 12 and the aircraft computer system 14.

Figure 4:
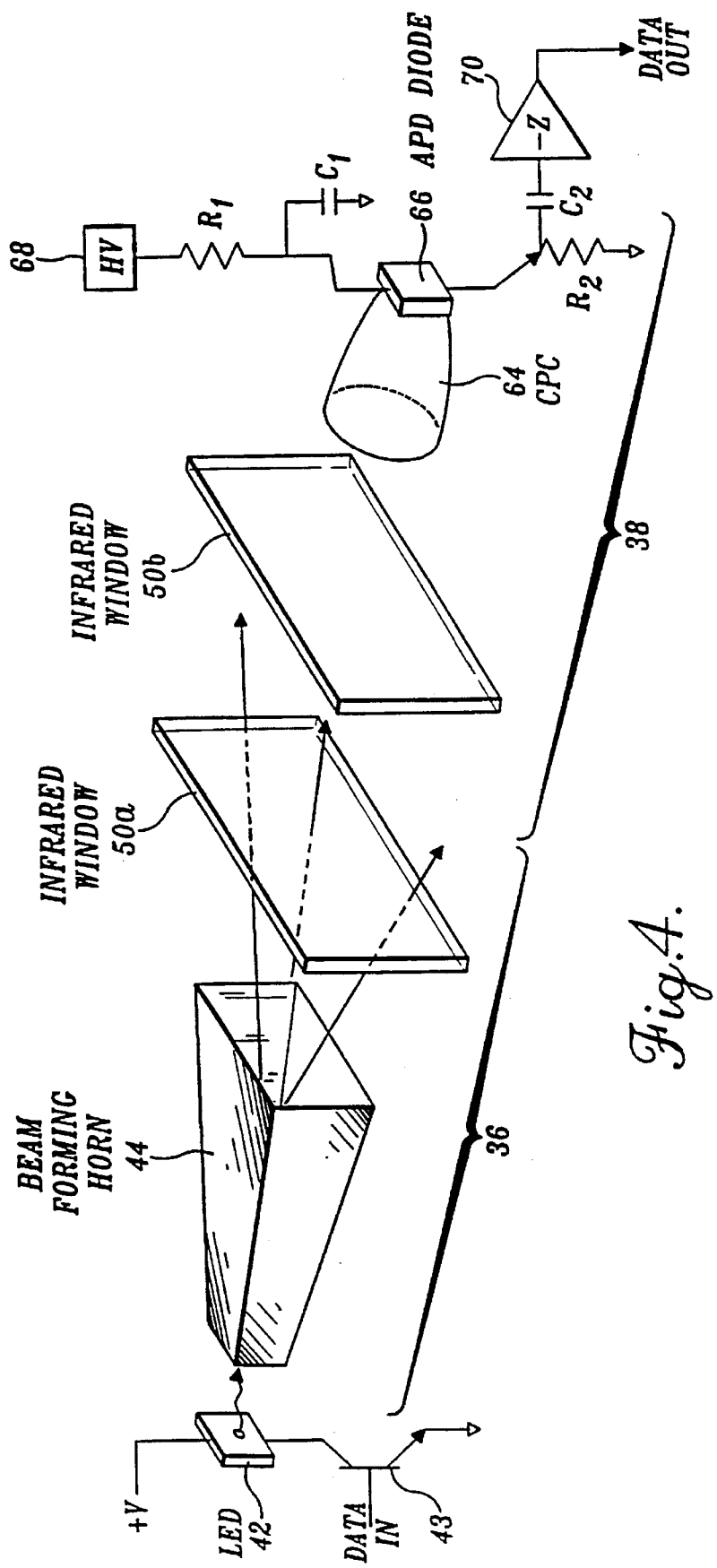
FIG. 4 shows an optical transmitter and an optical receiver according to the present invention.

A more detailed view of the optical transmitter 36 and the optical receiver 38 is shown in FIG. 4. For purposes of illustration, FIG. 4 shows one optical transmitter 36 and a corresponding optical receiver 38. However, as will be appreciated, the system includes a second optical transmitter and corresponding optical receiver to transmit data in the opposite direction. The optical transmitter 36 includes one or more infrared light emitting diodes (LEDs) 42 driven by a transistor 43. An electronic signal that corresponds to the data to be transmitted is applied to the base electrode of the transistor 43, causing the transistor 43 to conduct current and in turn causing the one or more LEDs 42 to produce an infrared optical signal. In the presently preferred embodiment of the invention, the LEDs 42 comprise a single high power infrared LED to produce the infrared optical signal. However, if more optical power is required, a plurality of LEDs connected either serially or in parallel could be used.

Because the infrared light produced by the one or more LED 42 extends at wide angles from the face of the LED, a beam-forming horn 44 is placed around the LED 42. As a result, the beam-forming horn 44 collects the infrared light and directs it towards the corresponding optical receiver 38. Preferably, the beam forming horn is a hollow, metal device made of gold-plated nickel to provide the required reflectivity. Alternatively, the beam-forming horn can be made of any type of transparent optical material, including plastic or glass. The dimensions of the beam-forming horn are chosen depending on the size of the target area and the separation between the transceivers. The beam-forming horn should take into account the illumination pattern of the LED and if the horn is made of a transparent material, the difference in the index of refraction between the transparent material and the surrounding air so that infrared light produced by the LED 42 is directed with equal intensity over the entire target area. The angles of the sides of the horn are approximately equal to the angles of the optical beam required to cover the target area. The design parameters are defined to optimize optical intensity in the target area.

If the LED has sufficient optical power, the beam-forming horn may be replaced with a traditional imaging lens or a compound parabolic concentrator bonded directly to the LED with an optical grade epoxy. However, the inventors have found that the use of a beam-forming horn provides the best optical communication link under most conditions.

The beam-forming horn 44 increases the optical power that is transmitted in the direction of the receiver as well as distributes the optical signals evenly over the target area. As described above, the target area is a rectangular section. The size of the target area compensates for variations or misalignments between the aircraft and the passenger loading bridge. If the aircraft is parked such that the corresponding optical receiver 38 is located anywhere in the target area, then communication can take place between the aircraft and ground-based computers.

Disposed at the output end of the beam-forming horn 44 is an infrared window 50a. The infrared window 50a passes light having frequencies in the infrared range and serves to protect the optical transmitter from dirt, rain, etc.

The optical receiver 38 includes an infrared window 50b that preferably only passes light having frequencies in the infrared range of the optical transmitter 36. Infrared light traveling through the infrared window 50b is collected by a dielectric, compound parabolic concentrator (CPC) 64. The CPC 64 is optically coupled to the light-sensitive surface of a photodiode 66. Preferably, the photodiode 66 is an avalanche photo detector (APD) type that conducts an electrical current that is proportional to the level of light received. However, other types of photo detectors could be used, such as a PIN photodiode. The CPC 64 has superior light-gathering properties as compared to the imaging lens typically used with optical detectors. The CPC has a large far field of view and can receive light from anywhere in the target area with high efficiency. The design parameters of the CPC are chosen to maximize the optical power detected in the target area. This large field of view is also sharply defined such that any light outside the field of view is not directed to the APD diode 66. This property also helps reduce the amount of ambient light received by the diode. Finally, the light-gathering properties of the CPC are nearly uniform across its field of view. Therefore, there are no "dead spots" within the CPC's field of view that would attenuate any optical signal detected. The CPC 64 is preferably made of a dielectric material bonded directly to the light-gathering surface of the APD diode 66 with an optical grade epoxy. The details of how to construct a compound parabolic concentrator are well known to those skilled in the optical arts and therefore will not be discussed further.

In some cases it may be desirable to place a cylindrical lens directly behind the infrared window 50b and in front of the CPC 64. When used, the cylindrical lens serves to modify a circular field of view of a CPC 64 into an elliptical field of view, where a noncircular field of view is needed. If used, the cylindrical lens increases the light that is detected by receiver 38 in one axis.

The APD diode 66 is biased with a temperature compensated high voltage source 68 that produces photo current gain that does not substantially vary over wide temperature ranges. Disposed between the high voltage source 68 and the APD diode 66 is a resistor $R_1$ and a capacitor $C_1$. The resistor $R_1$ acts to provide automatic gain control for the optical receiver 38 as follows. In general, the electrical current that is generated by an APD diode 66 for a given mount of light increases exponentially as the bias voltage increases. However, as the APD diode 66 in the receiver 38 conducts more and more current due to more light being received, the voltage drop across the resistor $R_1$ increases, thereby reducing the voltage that biases the APD diode 66, causing the APD diode to conduct less current. This negative feedback action tends to maintain the level of current conducted by the APD diode relatively constant despite fluctuations in the mount of input light received thereby preventing the APD diode from saturating, and keeping the output signal produced by the APD diode relatively uniform in magnitude. The capacitor $C_1$ operates in conjunction with the resistor $R_1$ such that the negative feedback is determined by slow or average variations of the received optical signal strength.

The temperature compensation provided by the high voltage source 68 is accomplished by comparing a fixed fraction of the bias voltage applied to the APD diode to a reference voltage produced by an IC temperature sensor (not shown) within the high voltage source 68. The difference between these two voltages drives a high-gain, negative feedback circuit that includes a fixed gain DC to DC converter (also not shown) so that the bias voltage adjusts over temperature to maintain constant APD current gain.

Connected between the output of the APD diode 66 and ground, or other reference potential, is a resistor $R_2$. Although the infrared window 50b removes most of the ambient light that may be impinging upon the APD diode 66, it is invariable that some ambient light will be collected by the CPC 64 and be passed to the APD diode. A coupling capacitor $C_2$ is connected between the output of APD diode 66 and a transimpedance amplifier 70. The capacitor $C_2$ passes only a time-varying portion of the output signal to the amplifier whereas current conducted by the diode 66 due to the ambient light is shunted to ground by resistor $R_2$. The time-varying portion of the output signal is directly proportional to the power of the optical signals produced by the optical transmitter 36 and received by the APD diode 66.

The transimpedance amplifier 70 with appropriate additional circuitry (not shown) converts an AC current flowing through the capacitor $C_2$ into a digital voltage signal that is transmitted to either the aircraft computer system 14 or the groundbased computer system, depending on whether the optical receiver 38 is located on the aircraft or on the ground.

As stated above, the free-space communications system according to the present invention also includes another optical transmitter and another optical receiver that transmit and receive data in the reverse direction. Together, these pairs of corresponding optical transmitters and receivers allow full duplex communication to take place between the aircraft computer system and the ground-based computer system. In operation, it is not necessary to vary the frequency of the optical signals that are transmitted from the aircraft to the ground-based computer system with respect to the frequency of the optical signals that are transmitted from the groundbased computer system to the aircraft. Full duplex transmission can take place if precautions are taken to ensure that the optical signals transmitted by a transceiver's optical transmitter are not received by the transceiver's own optical receiver. This may be accomplished in the present invention by splitting each transceiver's window into two halves 50a and 50b as shown and discussed in further detail below.

Figure 5:
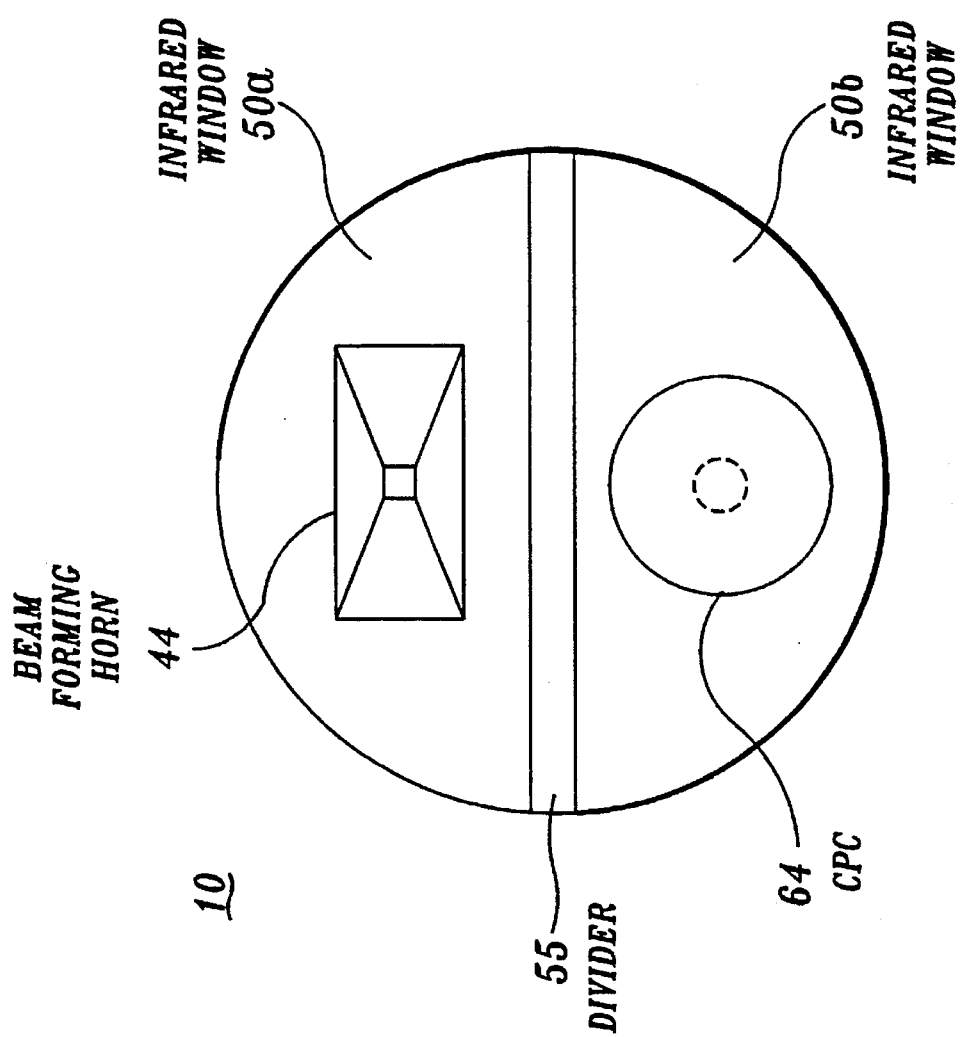
FIG. 5 shows an optical window located on the exterior of the aircraft for transmitting and receiving optical communication signals.

FIG. 5 shows an infrared window disposed on the exterior surface of an aircraft 10. The window is divided into two separate infrared windows 50a and 50b similar to those shown in FIG. 4. The window is mounted flush with the outer surface of the aircraft 10. A divider 55 separates the two infrared windows 50a and 50b to prevent light directed by the beam-forming horn 44 from leaking into the CPC 64. By preventing such leakage or cross-talk, the communication system according to the present invention can operate in full duplex at high data rates using the same frequency light pulses for data transmission in both directions.

Figure 6:
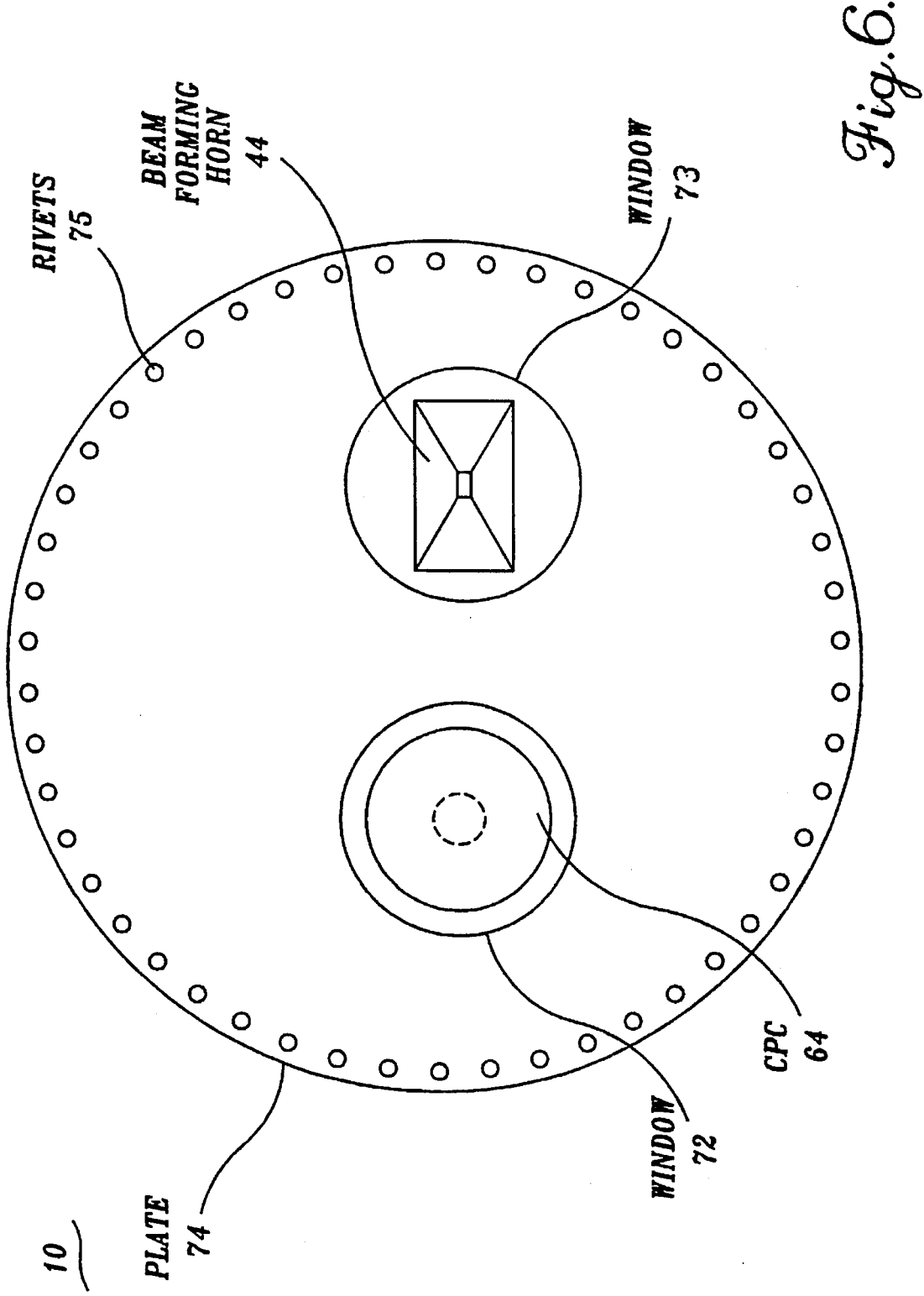
FIG. 6 shows an alternative arrangement of the transmitter and receiver located on the exterior of the aircraft.

An alternative and currently preferred arrangement for mounting the infrared transmitter and receiver on the exterior of the aircraft is shown in FIG. 6. In this arrangement, a pair of round infrared windows 72 and 70 are mounted in a single plate 74, which in turn is mounted flush with the exterior skin of the aircraft 10 using a plurality of rivets 75 or other suitable fastening mechanisms. Behind the window 73 is the beam-forming horn 44 for use in transmitting the infrared optical signal. Behind the window 72 is the CPC 64 used to receive the infrared optical signals. The physical separation of the infrared windows 72 and 73 reduce the possibility that the signal transmitted from a transceiver's transmitter section will be received by the transceiver's own receiver.

As will be appreciated, the communication system according to the present invention is "passive" in the sense that no special equipment is needed to align the optical transceivers. This has the benefit of not only being cheaper to manufacture but is also less likely to malfunction as the communication system is exposed to the environment.

While the preferred embodiment of the invention has been illustrated and described, it will be appreciated that various changes can be made therein without departing from the spirit and scope of the invention. It is therefore intended that the scope of the invention be determined solely from the following claims.

The embodiments of the invention in which an exclusive property or privilege is claimed are defined as follows:

1. A free-space optical communications system for transmitting data from an aircraft computer system to a ground-based computer system, comprising:

an optical transmitter coupled to the aircraft computer system for producing optical signals that correspond to the data to be transmitted between the aircraft computer system and the ground-based computer system, wherein the optical transmitter includes:
(a) a light source that produces optical signals corresponding to the data to be transmitted;
(b) means for gathering the optical signals produced by the light source and for distributing the optical signals uniformly over a target area;

an optical receiver coupled to the ground-based computer system, for receiving the optical signals produced by the optical transmitter, wherein the optical receiver includes:

(a) optoelectronic means for producing an output signal that corresponds to the data transmitted; and
(b) a compound parabolic concentrator coupled to the optoelectronic means, for gathering a portion of the optical signals produced by the light source and for directing the portion of the optical signals gathered to the optoelectronic means.

2. The free-space optical communications system of claim 1, further comprising:

an optical shroud that extends between the optical transmitter and the optical receiver for reducing the amount of ambient light that is received by the optical receiver coupled to ground-based computer system; and light-filtering means disposed in front of the optoelectronic means for reducing the mount of ambient light directed to the optoelectronic means.

3. The free-space optical communications system of claim 1, wherein the optical receiver further includes means for removing a portion of the output signal due to ambient light received by the optical receiver.

4. The free-space optical communications system of claim 1, further comprising:

gain control means coupled to the optoelectronic means, for regulating the magnitude of the output signal produced by the optoelectronic means.

5. The free-space optical communications system of claim 1, further including:

a temperature-compensated biasing means for providing a bias voltage to the optoelectronic means.

6. The free-space optical communications system of claim 1, wherein the means for gathering the optical signals produced by the light source and for distributing the optical signals uniformly over a target area comprises a hollow horn having a reflective interior coating.

7. The free-space optical communications system of claim 1, wherein the means for gathering the optical signals produced by the light source and for distributing the optical signals uniformly over a target area comprises a solid horn-shaped prism made of a substantially transparent material.

8. The free space optical communications system of claim 7 wherein the means for gathering the optical signals produced by the light source and for distributing the optical signals uniformly over a target area comprises a compound parabolic concentrator.

9. The free-space optical communications system of claim 1, wherein the means for gathering the optical signals produced by the light source and for distributing the optical signals uniformly over a target area comprises a lens disposed in front of the light source.

10. A free-space optical communications system for transmitting data bidirectionally between an aircraft computer system and a ground-based computer system, comprising:

a first optical transmitter coupled to the aircraft computer system and a second optical transmitter coupled to the ground-based computer system, each transmitter including:
(a) a light source that produces optical signals corresponding to the data to be transmitted between the aircraft computer system and the ground-based computer system;
(b) means for collecting the optical signals produced by the light source and distributing the optical signals uniformly over a target area; and a first optical receiver coupled to the ground-based computer system and a second optical receiver coupled to the aircraft computer system that receive the optical signals transmitted from a corresponding optical transmitter, wherein each optical receiver includes:

(a) a photodiode that produces an output signal that is proportional to a received optical signal;

(b) a compound parabolic concentrator bonded to the photodiode that collects the optical signals transmitted from the optical transmitter and directs the optical signals onto the photodiode;

(c) current shunt means coupled to an output of the photodiode for shunting away a portion of the output signal that is due to ambient light collected by the compound parabolic concentrator.

11. The free-space optical communications system of claim 10, wherein the first and second optical receiver each includes:

an optical filter disposed between the corresponding optical transmitter and the photodiode.

12. The free-space optical communications system of claim 10, wherein the first and second optical receivers each include:

a temperature-compensated voltage supply that provides a temperature-compensated biasing voltage to the photodiode.

13. The free-space optical communications system of claim 10, wherein the first and second optical receivers each include:

means for extracting a time varying portion of the output signal produced by the photodiode.

14. A free-space optical communications system for transmitting data bidirectionally between an aircraft computer system and a ground-based computer system, comprising:

a pair of optical transmitters, one of which is coupled to the aircraft computer system and another of which is coupled to the ground-based computer system, wherein each of the optical transmitters includes:

(a) one or more light-emitting diodes (LEDs) that produce optical signals that correspond to data to be transmitted;

(b) a hollow horn having a reflective interior surface that surrounds the one or more LEDs for uniformly distributing optical signals produced by the LEDs over a target area, and a pair of optical receivers, one of which is coupled to the aircraft computer system and another of which is coupled to the ground-based computer system, wherein each optical receiver includes:

(a) means for gathering light that impinges upon the optical receiver;

(b) a photodiode bonded to the means for gathering light, the photodiode producing an electrical signal that is proportional to the amount of light gathered; and (c) filter means disposed in front of the means for gathering light for reducing the amount of ambient light received by the photodiode.

15. The free space, optical communications system of claim 14, wherein the means for gathering light comprises a compound parabolic concentrator.

16. A method of optically transmitting data between an aircraft computer system and a ground-based computer system, comprising the steps of:

producing an infrared optical signal that corresponds to the data to be transmitted;

directing the infrared optical signal through light distributing means so that the optical signal is evenly distributed within a target area in which an optical receiver is positioned;

gathering light at the optical receiver using a compound parabolic concentrator that is bonded to a photodiode, the photodiode producing an electrical signal proportional to the amount of light gathered;

removing a component of the electrical signal produced by the photodiode due to ambient light gathered by the compound parabolic concentrator; and coupling an AC component of the electrical signal produced by the photodiode to an amplifier, wherein a magnitude of the AC component of the electrical signal is proportional to the data transmitted between the aircraft computer system and the ground-based computer system.

17. An optical transceiver adapted to be coupled to an exterior of an aircraft for transmitting and receiving data between an aircraft computer system and a ground-based computer system comprising:

an optical transmitter for producing optical signals that correspond to data to be transmitted from the aircraft computer system to the ground-based computer system, including:

(a) one or more light sources coupled to the aircraft computer system for producing the optical signals corresponding to data that is transmitted from the aircraft computer system to the ground-based computer system;

(b) light distributing means for gathering the optical signals and distributing the optical signals uniformly over a target area;

an optical receiver for receiving optical signals that are transmitted from a second optical transmitter coupled to the ground-based computer system, including:

(a) a photodiode that produces an output signal that is proportional to a received optical signal;

(b) a compound parabolic concentrator bonded to the photodiode that collects optical signals and directs the collected optical signals onto the photodiode; and (c) a current shunt coupled to the output signal produced by the photodiode that shunts a portion of the output signal due to ambient light collected by the light-collecting means.

18. An optical communications system for transmitting data bidirectionally between a first computer system and a second computer system, comprising:

an optical transmitter coupled to the first computer system for producing optical signals that correspond to the data to be transmitted between the first computer system and the second computer system, wherein the optical transmitter includes:

(a) light-producing means for producing optical signals corresponding to the data to be transmitted;

(b) light distributing means for gathering the optical signals produced by the light-producing means and for distributing the optical signals uniformly over a target area;

an optical receiver coupled to the second computer system for receiving the optical signals produced by the optical transmitter, wherein the optical receiver includes:

(a) a photodiode for producing an output signal that is proportional to a received optical signal, the output signal of the photodiode being coupled to the second computer system for producing an output signal that corresponds to the data transmitted;

(b) a compound parabolic concentrator bonded to the photodiode for gathering a portion of the optical signals produced by the light-producing means and for directing the portion of the optical signals gathered to the photodiode; and (c) light-filtering means disposed in front of the compound parabolic concentrator for reducing the amount of ambient light received by the photodiode.

19. The optical communications system of claim 18, wherein the optical receiver further includes current shunt means coupled to the photodiode for removing a portion of the output signal due to ambient light received by the optical receiver.

20. The optical communications system of claim 18, further comprising:

gain control means coupled to the photodiode for regulating the magnitude of the output signal produced by the photodiode.

21. The optical communications system of claim 18, further including:

a temperature-compensated biasing means for providing a bias voltage to the photodiode.

* * * * *